(12) United States Patent
Brouckaert et al.

(10) Patent No.: US 8,591,786 B2
(45) Date of Patent: Nov. 26, 2013

(54) METHOD FOR MANUFACTURING FLOOR PANELS, AS WELL AS FLOOR PANEL OBTAINED BY MEANS OF SUCH METHOD

(75) Inventors: Dries Brouckaert, Gullegem (BE); Christian Vandevoorde, Zulte (BE)

(73) Assignee: Flooring Industries Limited, SARL, Bertrange (LU)

( * ) Notice: Subject to any disclaimer, the term of this patent is extended or adjusted under 35 U.S.C. 154(b) by 117 days.

(21) Appl. No.: 13/241,886

(22) Filed: Sep. 23, 2011

(65) Prior Publication Data

US 2012/0012248 A1    Jan. 19, 2012

Related U.S. Application Data

(63) Continuation of application No. 11/884,882, filed as application No. PCT/IB2006/000822 on Feb. 15, 2006, now Pat. No. 8,056,236.

(60) Provisional application No. 60/674,718, filed on Apr. 26, 2005.

(30) Foreign Application Priority Data

Feb. 23, 2005   (BE) .................................. 2005/0096

(51) Int. Cl.
*B29C 33/38* (2006.01)

(52) U.S. Cl.
USPC ........... 264/219; 264/112; 264/293; 264/460; 264/482

(58) Field of Classification Search
USPC .......................... 264/112, 219, 293, 460, 482
See application file for complete search history.

(56) References Cited

U.S. PATENT DOCUMENTS

| | | | | |
|---|---|---|---|---|
| 3,679,863 A | * | 7/1972 | Houldcroft et al. | 219/121.72 |
| 4,034,032 A | * | 7/1977 | Hendricks | 264/28 |
| 4,469,930 A | * | 9/1984 | Takahashi | 219/121.72 |
| 4,469,931 A | * | 9/1984 | Macken | 219/121.67 |
| 4,943,700 A | | 7/1990 | Hughes et al. | |
| 5,578,229 A | * | 11/1996 | Barnekov et al. | 219/121.72 |
| 5,785,903 A | * | 7/1998 | Inoue et al. | 264/2.5 |
| 5,792,411 A | * | 8/1998 | Morris et al. | 264/400 |
| 5,985,078 A | | 11/1999 | Suess et al. | |

(Continued)

FOREIGN PATENT DOCUMENTS

| | | |
|---|---|---|
| AU | A-58961/86 | 12/1986 |
| DE | 40 33 255 A1 | 4/1992 |

(Continued)

OTHER PUBLICATIONS

V. G. Barnekov et al., Factors Influencing laser cutting of wood, Forest Products Journal, v. 36, No. 1, 1986, pp. 55-58.

(Continued)

*Primary Examiner* — Monica Huson
*Assistant Examiner* — Saeed Huda
(74) *Attorney, Agent, or Firm* — Bacon & Thomas, PLLC

(57) ABSTRACT

Method for manufacturing floor panels having a top layer having a composition based on a synthetic material. At least at two opposite sides, the floor panels have profiled edge areas that include at least coupling parts. For manufacturing the floor panels, one starts from a board-shaped material, and the floor panels are formed at least partially by way of a laser treatment of the board-shaped material.

8 Claims, 9 Drawing Sheets

(56) References Cited

U.S. PATENT DOCUMENTS

| | | | |
|---|---|---|---|
| 6,393,687 B1 | 5/2002 | Friedrich | |
| 6,438,919 B1 * | 8/2002 | Knauseder | 52/586.2 |
| 6,447,704 B1 * | 9/2002 | Covino | 264/219 |
| 6,633,019 B1 * | 10/2003 | Gray | 219/121.71 |
| 6,647,690 B1 * | 11/2003 | Martensson | 52/601 |
| 7,018,580 B2 * | 3/2006 | Gorczyca et al. | 264/219 |
| 7,285,234 B2 * | 10/2007 | Pfeifer et al. | 264/113 |
| 7,527,760 B2 * | 5/2009 | Watanabe et al. | 264/496 |
| 7,985,358 B2 * | 7/2011 | Han et al. | 264/2.5 |
| 7,988,889 B2 * | 8/2011 | Lee | 264/2.5 |
| 8,057,729 B2 * | 11/2011 | Stone et al. | 264/400 |
| 8,082,959 B2 * | 12/2011 | Boucke | 144/350 |
| 8,105,526 B2 * | 1/2012 | Stone et al. | 264/400 |
| 8,313,679 B2 * | 11/2012 | Guichon et al. | 264/219 |
| 2002/0038924 A1 * | 4/2002 | Nilsson et al. | 264/236 |
| 2002/0179582 A1 * | 12/2002 | Reichmann et al. | 219/121.84 |
| 2003/0001313 A1 * | 1/2003 | Krause et al. | 264/434 |
| 2004/0035078 A1 * | 2/2004 | Pervan | 52/589.1 |
| 2004/0172904 A1 * | 9/2004 | Martensson | 52/384 |
| 2004/0182510 A1 * | 9/2004 | Pfeifer et al. | 156/284 |
| 2004/0247732 A1 * | 12/2004 | Walk | 425/385 |
| 2005/0077656 A1 * | 4/2005 | Watanabe et al. | 264/482 |
| 2005/0127562 A1 * | 6/2005 | Covino | 264/219 |
| 2006/0001190 A1 * | 1/2006 | Priedeman et al. | 264/219 |
| 2006/0099386 A1 * | 5/2006 | Smith | 428/151 |
| 2009/0155612 A1 * | 6/2009 | Pervan et al. | 428/498 |
| 2010/0051780 A1 * | 3/2010 | Lee | 249/114.1 |

FOREIGN PATENT DOCUMENTS

| | | |
|---|---|---|
| DE | 94 02 681 U1 | 6/1994 |
| EP | 1 719 596 A1 | 11/2006 |
| JP | 60-127102 | 7/1985 |
| WO | WO 95/25621 | 9/1995 |
| WO | WO 99/20442 | 4/1999 |
| WO | 03083234 A1 | 10/2003 |
| WO | WO 2004/050359 A1 | 6/2004 |
| WO | WO 2006/003119 A1 | 3/2006 |
| WO | WO 2007/012561 A1 | 2/2007 |

OTHER PUBLICATIONS

F. Weisner, "Laserintegration in ein CNC-Dreh-Fräszentrum", Messtechnik, Hausen, Munich, Germany, v. 102, No. 9, Sep. 1, 1994, pp. 390-392.

V. Barnekov et al., "Laser machining wood composites", Forest Products J., Oct. 1989, pp. 76-78.

* cited by examiner

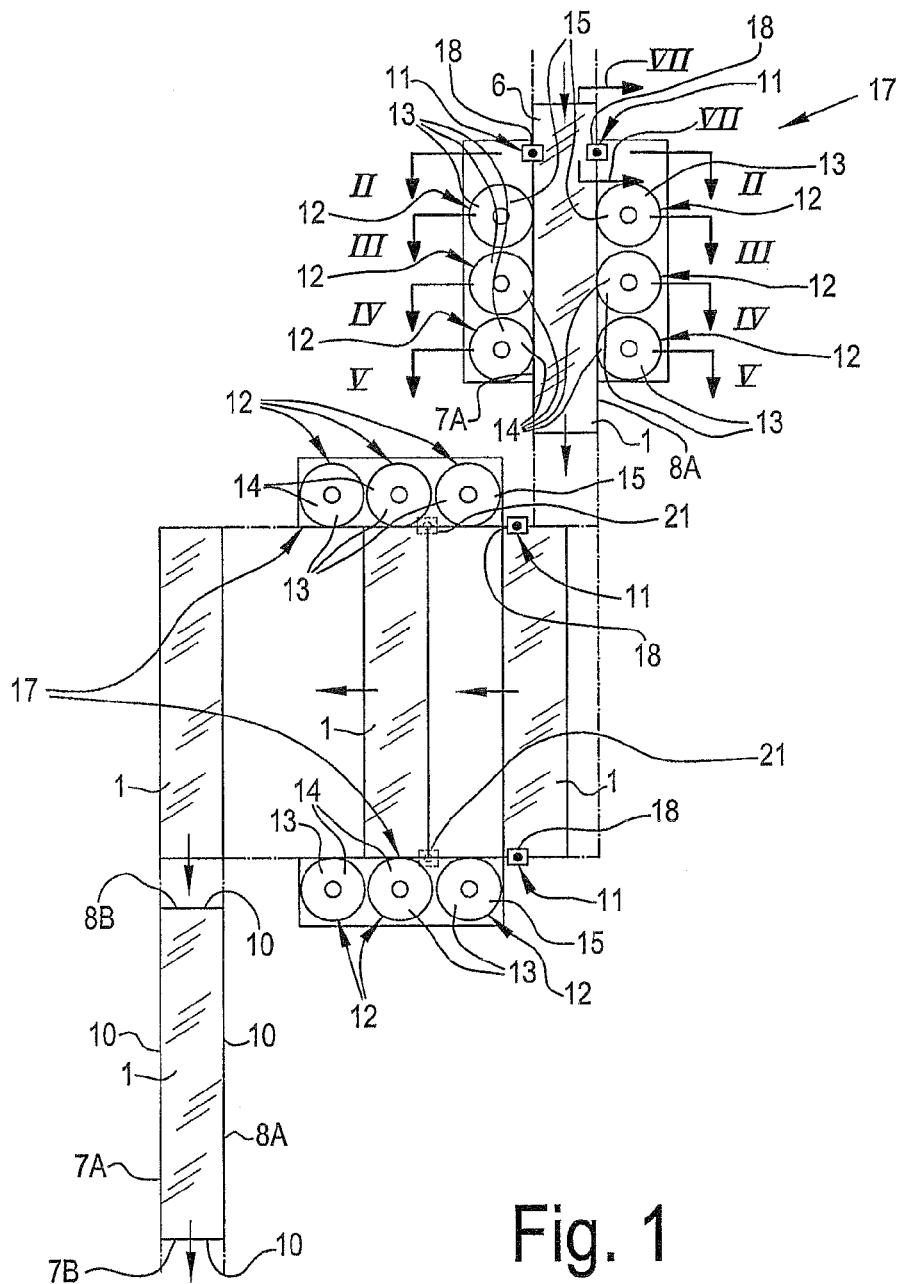
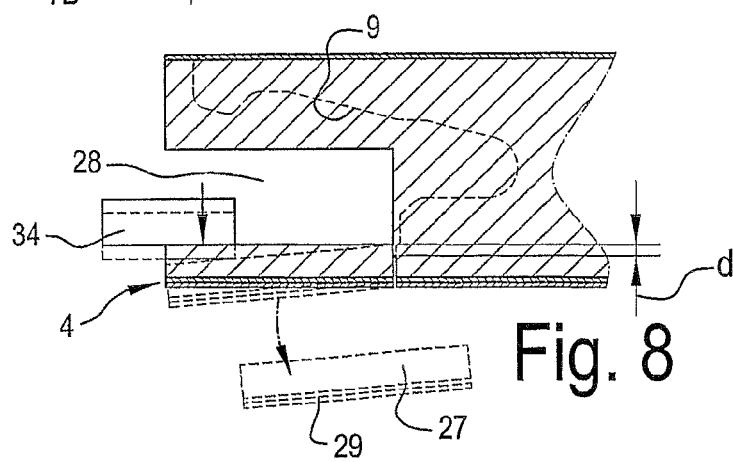
Fig. 1
Fig. 8

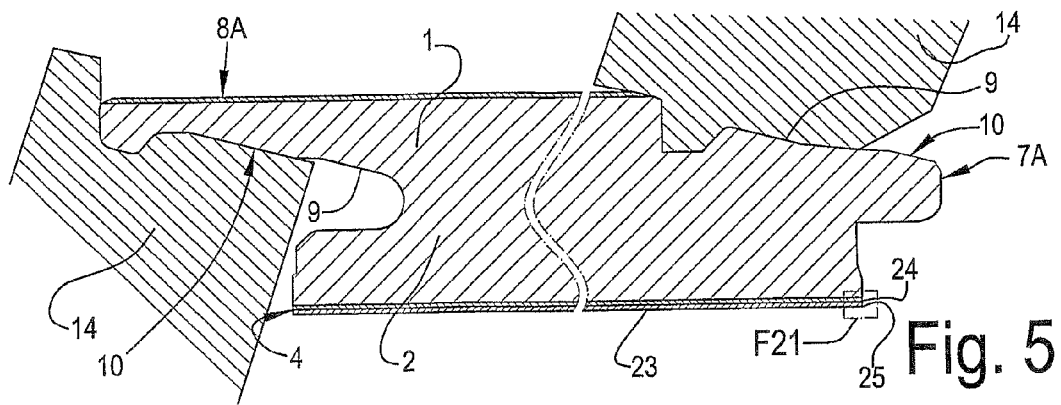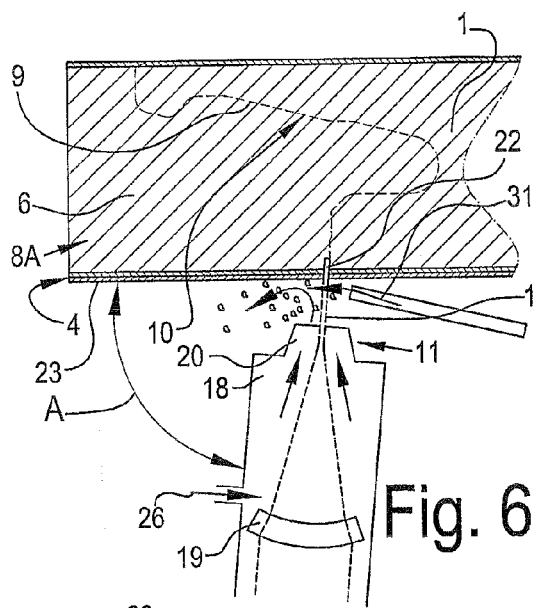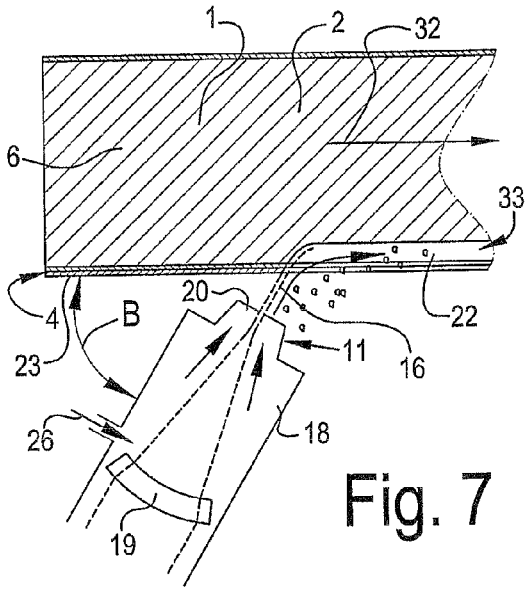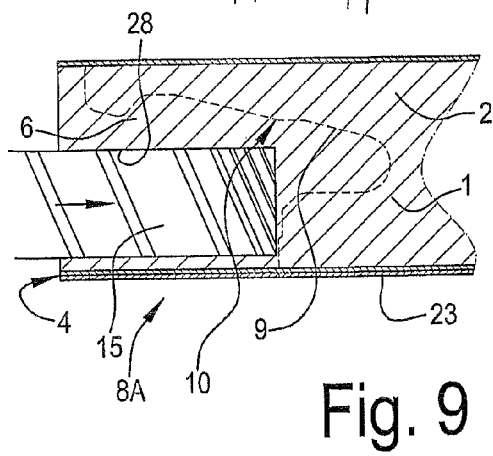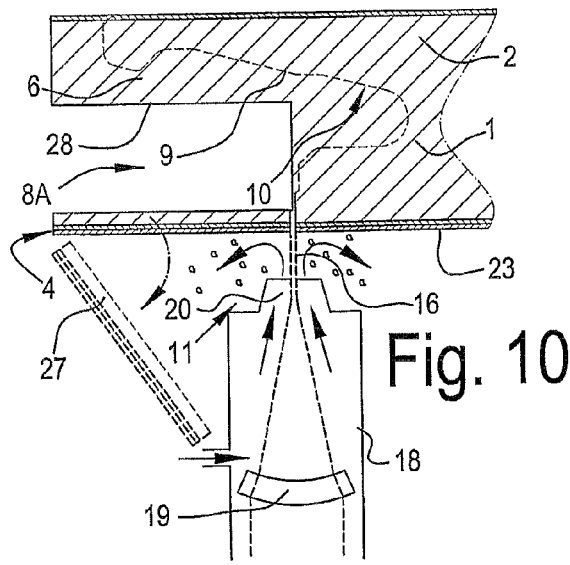

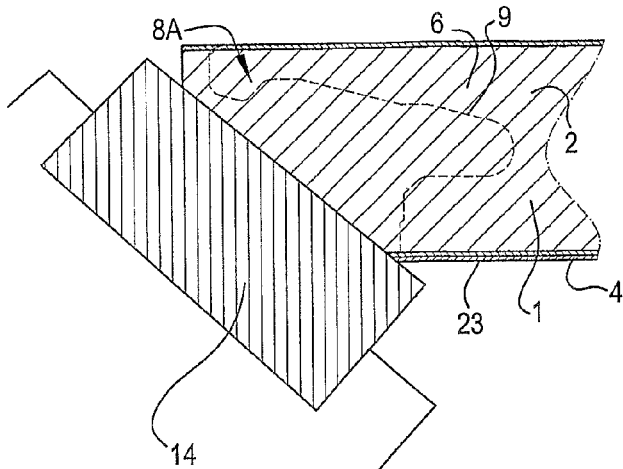
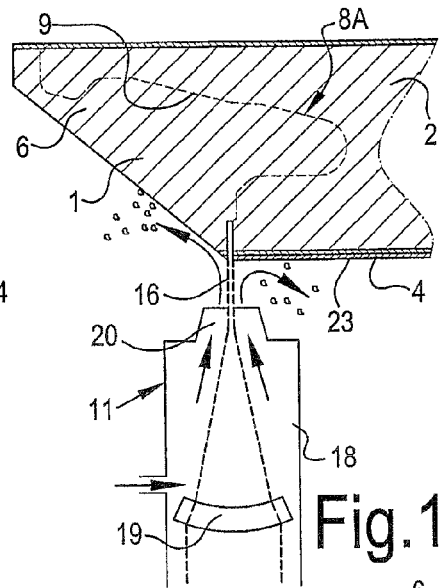
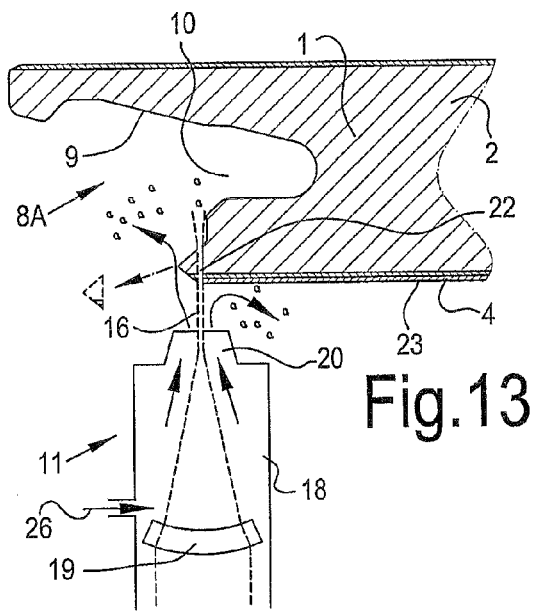
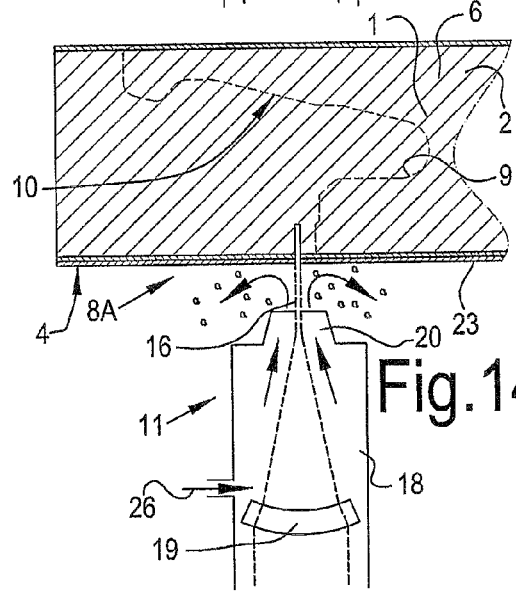
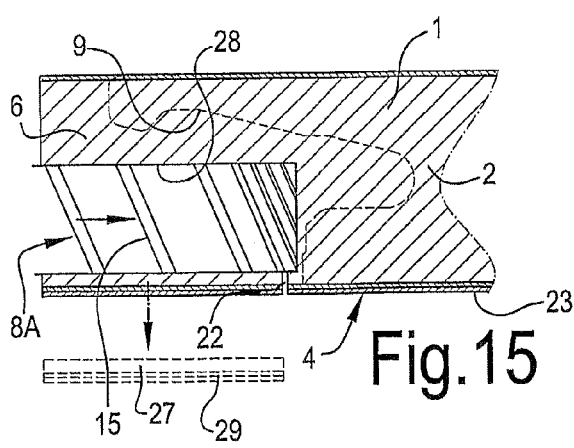
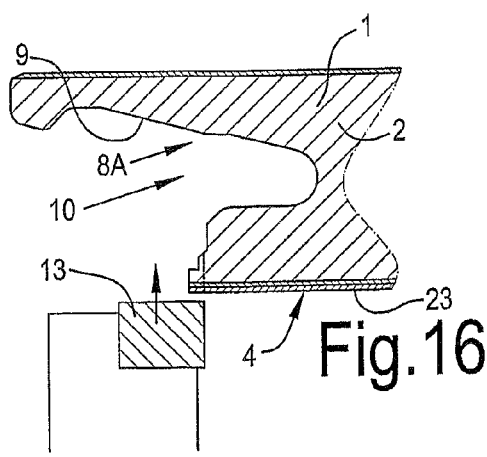

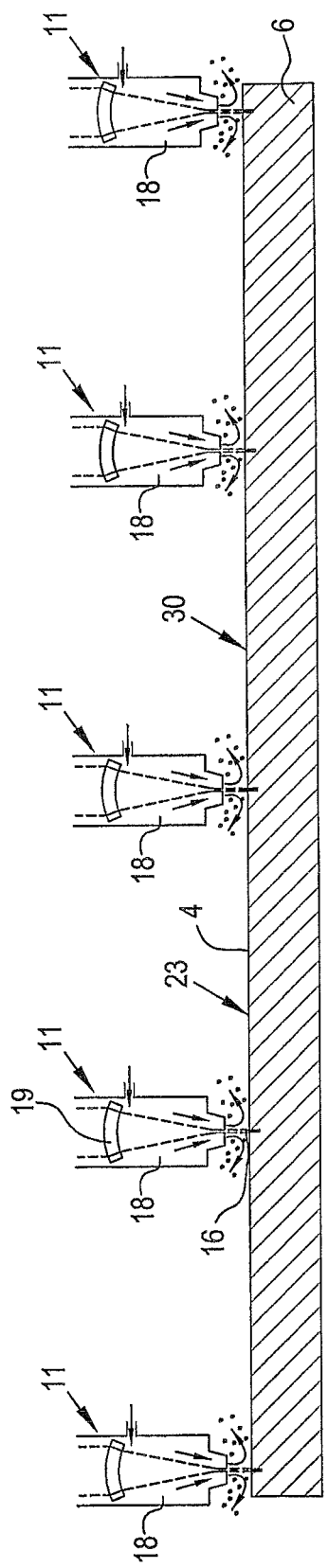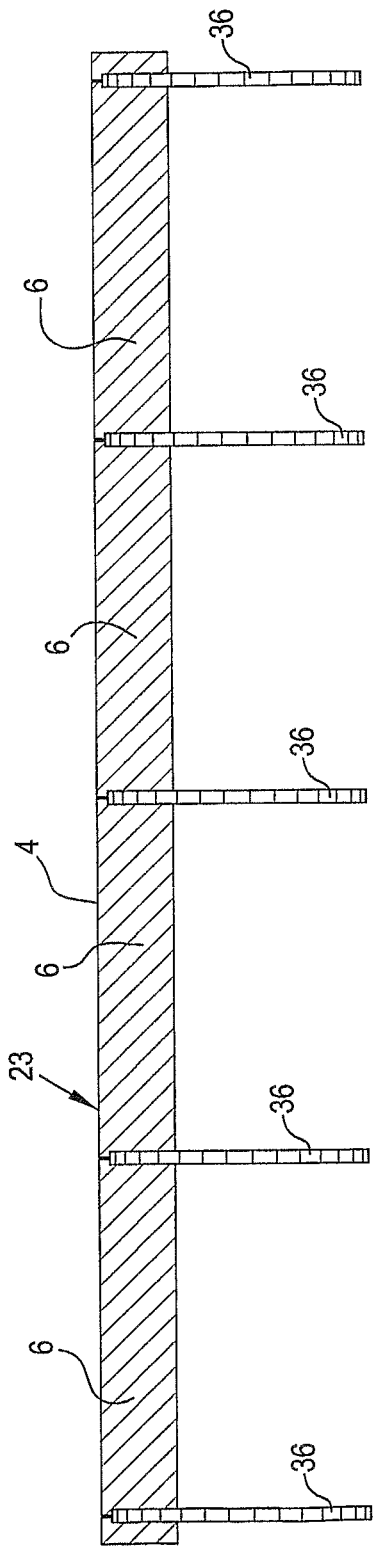

METHOD FOR MANUFACTURING FLOOR PANELS, AS WELL AS FLOOR PANEL OBTAINED BY MEANS OF SUCH METHOD

This application is a continuation of application Ser. No. 11/884,882, filed Aug. 22, 2007, which claims the benefit under 35 USC 119(e) of U.S. provisional application No. 60/674,718 filed on Apr. 26, 2005, and which is also the national stage entry under 35 USC 371 of international application No. PCT/IB2006/000822, filed on Feb. 15, 2006, and which also claims, under 35 USC 119, priority to Belgium application No. 2005/0096, filed on Feb. 23, 2005, which applications are all herein incorporated by reference in their entirety, inclusive of the specification, claims, and drawings.

This invention relates to a method for manufacturing floor panels, as well as to a floor panel obtained by means of such method.

More particularly, the invention relates to a method for manufacturing floor panels, of the type comprising a top layer on the basis of synthetic material, and in particular to floor panels mostly denominated laminate panels.

It is known that such floor panels can be of different construction.

Mostly, such laminate panels comprise at least a core, a decor, as well as a top layer on the basis of synthetic material. The top layer mostly consists of a number of carrier sheets, for example, of paper, which are soaked in resin, for example, a melamine resin, such as melamine formaldehyde. In such case, it is common to perform the laminate as a so-called "DPL" (Direct Pressure Laminate), whereby the top layer is pressed directly upon the core, or so-called "HPL" (High Pressure Laminate"), whereby the top layer as such is obtained by means of a pressure treatment before providing the top layer as a whole on the core. Also, other possibilities for forming such top layer are possible, for example, by making use of films, by applying a substance to be hardened, such as a varnish or the like, or in any other manner. The decor mostly is printed, either directly on the core, with the possible intermediary of a primer, or on one or more of the aforementioned carrier sheets or on the aforementioned film.

It is also known that such floor panels can be applied for forming a floating floor covering. Hereby, these floor panels, during installation, are coupled at their edges, either by means of a classical tongue and groove connection, whereby these possibly are glued into each other, or by means of mechanical coupling parts providing for a mutual coupling of the floor panels in horizontal as well as in vertical directions, for example, as described in the international patent application WO 97/47834. This document describes how the respective coupling parts can be formed while moving the floor panel over rotating mechanical cutting tools. This method is also called continuous milling.

From the international patent application WO 01/96688, it is also known to remove a material portion from the upper edge of such laminate panels, such that the resulting surface forms, for example, a chamfer, whether or not then being covered by a decorative layer.

The present invention aims at a method for manufacturing floor panels that allows to obtain a better and/or less expensive and/or more flexible and/or more reliable good finish. Also, the invention aims at a floor panel having such finish.

To this aim, the invention according to its first aspect relates to a method for manufacturing floor panels of the type, which comprises a top layer on the basis of synthetic material and which, at least at two opposite sides, has profiled edge areas that comprise at least coupling parts, whereby, for manufacturing the floor panels, one starts from a board-shaped material, with the characteristic that the floor panels are formed at least partially by means of a laser treatment of said board-shaped material.

Applying a laser treatment when forming floor panels in most cases, however, not always, means the elimination of at least one traditional treatment, for example, a treatment with a rotating mechanical cutting tool, such as a milling cutter. A laser treatment requires less maintenance than, for example, the maintenance required by the wear of a milling cutter. Moreover, by means of a laser beam a thin and/or smooth cut is easier to obtain than, for example, with a saw or a milling cutter.

Preferably, for forming the floor panels of the board-shaped material, use shall be made of said laser treatment as well as of at least one or more other treatments, said treatments being performed by means of one or more mechanical cutting tools, for example, rotating mechanical cutting tools, such as milling cutters or saws.

Said laser treatment can be performed on a board-shaped material, of which during or after this treatment floor panels are obtained, as well as to a board-shaped material having already the desired or almost the desired dimensions of the respective floor panels.

Preferably, the laser treatment shall at least be applied for removing a material portion from the top layer of the floor panel. In a preferred form of embodiment, hereby the laser treatment and the aforementioned other treatments are combined such that, by applying the laser treatment, the contact between, on the one hand, the cutting tool, cutting tools, respectively, and, on the other hand, the aforementioned top layer is reduced, more particularly is reduced in respect to the contact usually existing between such cutting tools and the top layer, when such floor panels were to be manufactured entirely by means of mechanical cutting treatments of the board-shaped material. Reducing this contact means a global reduction of the wear and a prolongation of the service life of the respective cutting tool, cutting tools, respectively. Limiting the mechanical contact with the top layer also effects a better and more reliable quality of the floor panel. This advantage is particularly present in floor panels with a rather brittle top layer, which breaks under the influence of mechanical contact, such as, for example, a thermosetting top layer on the basis of melamine formaldehyde. More particularly, this advantage manifests itself in particular in floor panels with top layers in which a wear-resistant material, for example, corundum, is incorporated, as such material causes a high wear and tear with cutting tools and this disadvantage can be considerably reduced by using a laser treatment.

In a particular preferred form of embodiment, by means of the laser treatment, material is removed transversally through the top layer, over the entire thickness thereof, preferably in the form of a cut extending through the top layer. Hereby, it is advantageous to combine the laser treatment and said other treatments such that, by applying the laser treatment, the contact between the mechanical cutting tools and said top layer is entirely excluded.

Preferably, the aforementioned profiled edge area of the floor panels is formed at least partially by the laser treatment. Hereby, in a particular preferred form of embodiment, at least a portion of the final surface of the profiled edge area is realized by means of the laser treatment. It is not excluded to provide this profiled edge area with a chamfer, whereby the final surface of this chamfer is formed at least partially by means of the aforementioned laser treatment.

Preferably, the final surface of the profiled edge area is also formed, at least partially, by the aforementioned other treatments. Hereby, then, for example, use shall be made of mechanical tools, for example, rotating milling tools and/or broaches. The use of mechanical tools for forming the profiled edge areas in floor panels, which at least comprise coupling parts, as such is known, for example, from WO 97/47834. According to the present invention, however, as explained above, by applying these tools in combination with a laser treatment, the contact between these tools and the top layer, however, can be limited or even excluded, which limits the wear and tear of the mechanical tools and may effect a more qualitative finishing.

It is known, when providing the profiled edge area and the coupling parts, to move the floor panels along mechanical tools, for example, by applying the so-called continuous milling. In such configuration, within the scope of the present invention, it is recommended to fixedly attach the laser lens and to move the floor panels also along the laser beam. However, it is not excluded to install the laser lens movable and/or to keep the panel still. Said laser treatment preferably shall take place on a line, and the possibly removed material portion preferably shall be deeper than 0.2 mm, and even better deeper than 1 mm, such that the aforementioned material portion in depth direction comprises a large part of the top layer and preferably continues to below the top layer.

Surprisingly, the inventors have found that, when forming said line, speeds can be reached that are comparable to the speeds reached in continuous milling, for example, speeds of more than 100 m/min, or even better more than 150 m/min. Speeds of more than 200 m/min are also not excluded. Speeds of more than 100 m/min allow to install such laser treatment in line with, for example, a milling process without reducing the production speed.

When, by means of said laser treatment, the final upper edge of the floor panel is formed, at least for a portion of the circumference thereof, then a method fulfilling the first aspect of the invention will effect an exceptionally high-quality edge finishing of the floor panel. Presumably, this is due to the fact that, when performing such laser treatment, the top layer, at least at the height of said upper edge, can reach a temperature at which the synthetic material in the top layer becomes plastic, such that, after performing the laser treatment, for example, when the top layer cools off, a smooth upper edge is formed.

In a preferred form of embodiment, the final upper edge formed by means of the laser treatment is performed with an undercut. This can be realized in any manner, for example, by inclining the laser beam, adjusting and/or positioning the focus of the laser treatment in respect to the workpiece, or similar.

As such, for the manufacture of floor panels, it is known to start from a board-shaped material upon which said top layer is present and whereby a top layer is concerned that comprises particles of a wear-resistant material, for example, a ceramic material, such as $Al_2O_3$, SiC, diamond, etc. Applying a method according to the first aspect of the present invention for manufacturing such floor panels entails particular advantages. With a treatment that is performed at the upper side of the floor panel, it is expected that said particles are molten, vaporized or split, which effects a very high-quality treatment, in view of the fact that there are no, or almost no, projecting hard parts at the obtained surface. This is contrary to, for example, a milling process, whereby either the wear-resistant particles will be drawn out of the top layer, or the top layer around the hard particles will be removed, such that these particles form projecting hard parts on the obtained surface. In comparison with a method whereby the same material portion of the top layer is removed by means of a milling treatment, a laser treatment of a top layer with wear-resistant particles also includes a further restriction of tool wear. Moreover, this method offers a more constant quality and, thus, a more reliable treatment.

In particular, the invention preferably shall be applied for manufacturing laminate floor panels comprising a core, whether or not composed of several layers or portions, a decor, as well as said top layer of synthetic material. Preferably, the top layer of such laminate floor panel then shows one or more of the following features:

that it consists of maximum three carrier sheets soaked in resin and pressed upon the core, amongst which a printed decor layer;

that it is manufactured in the form of "DPL";

that it is thinner than 0.5 mm.

Due to its small thickness, such top layer is exceptionally suitable for being subjected to laser cutting treatments.

When manufacturing floor panels, more particularly laminate floor panels, in the traditional manner by means of rotating cutting tools, the top layer often is affected, and in case of a brittle top layer, for example, of a thermosetting resin such as melamine formaldehyde, is broken, which, for example, in the case of a DPL (Direct Pressure Laminate), leads, amongst others, to a white line showing at the edge of the panels, which remains visible in an annoying manner in a floor covering consisting of several of such floor panels. Coloring the edges of such panels by means of a coloring agent in order to mask these disturbing edges is known. The present invention does not exclude that, during performing of a method according to the first aspect by means of the laser treatment, whether or not in combination with additional treatments, a thermal surface treatment is effected in at least a portion of the final surface of the profiled edge area. Preferably, this thermal surface treatment consists at least in a discoloration. By means of the heat development of a laser treatment and the depositing of a portion of the possibly removed material, a portion of the profiled edge area, for example, the upper edge of the floor panel, can be colored dark. This latter may also avoid that the edge of a laminate panel becomes visible in a disturbing manner and may make the coloring of the edges by means of a coloring agent redundant. Another possible surface treatment consists at least of heating the surface by means of the laser treatment, followed by smoothing the heated surface in the heated condition, in order to improve the smoothness of the surface.

According to another possible form of embodiment, the laser treatment is applied at least, and in a particular form of embodiment is applied solely, for heating the surface of the floor panels, or at least a portion of the surface of the floor panels, with the intention of influencing the mechanical and/or thermal and/or other features of said portion. Such heating of the surface of the floor panels may result, for example, in that a subsequent treatment of this heated and preferably still warm portion, such as a treatment with a mechanical tool or a treatment with a laser beam or other beam, can be performed more efficiently. So, for example, the wear of the mechanical tool may be restricted by this, or the energy coupling of the laser light into the surface during the possibly following laser treatment may be influenced beneficially. In the case that the floor panels relate to laminate panels with a top layer on the basis of synthetic material, such heating may lead to an at least temporary local softening of the respective top layer. This softening can be advantageously applied in particular when the top layer, apart from synthetic material, also comprises hard particles, such as aluminum oxide (Al2O3). In that case a subsequent treatment of the top layer with a mechanical tool experiences less resistance in order to remove the hard particles together with the softened synthetic material, which can lead to a significant reduction of wear for the mechanical tool and a better finishing quality of the top layer. So, for example, may the top layer be softened in order to subsequently perform a mechanical cutting treatment through the softer top layer, for example, for forming the aforementioned profiled edge areas.

As aforementioned, the laser treatment of the first aspect of the invention, however, preferably results in an effective material removal from the top layer. In a board-shaped laminate material, the material portion removed by the laser treatment best continues into the core, for example, up to a depth of 0.7 to 2 mm below the upper side of the panel. It is not excluded that said laser treatment is applied in order to remove solely a material portion from the core. By a laser treatment, cuts can be performed, rounded or inclined parts can be provided at locations that are difficult to reach or cannot be reached by cutting tools.

However, it is noted that, if one wants to avoid a depositing of the removed material portion on the upper side of the panel, during performing the laser treatment, a blowing effect is provided, too, in order to remove released material portions. The blowing effect can take place by means of, either, on the one hand, the cutting gas flowing from the nozzle (in English called "nozzle") preferably with a pressure of 6 bar or more, coaxially to the laser beam, or, on the other hand, an extern additional gas flow having, for example, also a pressure of 6 bar. In order to obtain an optimum removal of the released material, preferably a blowing and/or suction effect is provided, which is characterized by one or more and preferably a combination of the following features:

- that there is at least a blowing effect substantially according to a direction opposite to the direction with which the laser front moves along the board-shaped material;
- that there is at least a blowing effect substantially according to a direction situated transversally to the direction with which said laser front is moving along the board-shaped material, and at the same time directed away from the finally to be formed floor panel;
- that there is at least a suction effect transverse, and preferably substantially perpendicular, to the surface or the decorative side of the floor panel to be formed, above the already formed cut in the immediate proximity of the laser front.

It is noted that by applying a blowing and/or suction effect with the above-mentioned features, also the possible creation of nasty smells is counteracted and the deposition of nasty-smelling particles on the produced floor panels is excluded or minimized. According to a variant, instead of gas flows or in combination with a gas flow, rinsing cycles may be performed with a liquid medium, such as water, alcohol or the like. These rinsing cycles may be particularly useful for preventing the occurrence of said nasty smells.

In a particular preferred form of embodiment, one works with a laser situated at an angle in respect to the surface of the board-shaped material, whereby the arrangement at an angle is performed such that it fulfils at least one of the following and preferably a combination of the following features:

- that the surface presented to the laser treatment, in other words, the surface situated immediately in front of the laser front, and the laser beam form an angle smaller than 90°, as measured in a projection of the laser beam onto a plane situated perpendicularly to the plane of the plate-shaped material and extending according to the direction of advancement of the laser front.
- that the surface presented to the laser treatment and the laser beam form an angle between 50 and 70°, for example, 60°;
- that the surface presented to the laser treatment and the laser beam form an angle according to any of the above-defined possibilities, whereby next to the laser beam, a gas flow is supplied to the floor panel by means of the same laser head, in substantially the same direction.

Such inclination of the laser beam offers particular advantages in respect to the quality of the laser treatment. It may lead to a more efficient treatment, a qualitatively higher finish and/or less contamination by deposition of the removed material.

Applying the method according to the first aspect of the invention for manufacturing floor panels consisting at least partially of a material on the basis of fibers, preferably wood fibers, which are consolidated with a binding agent, such as MDF or HDF, results in a broad range of advantages. So, by means of a laser treatment, for example, surfaces without protruding fibers can be obtained. It is known that laminate floor panels often comprise a core of such material.

When performing the aforementioned treatment step according to the first aspect of the invention, it is possible that the binding material at the height of said edge becomes plastic and that this treatment step is followed by a treatment whereby the fibers at the height of the edge are pressed into the binding material by means of a pressing element, such that, when the binding material cools off, a smooth surface is obtained.

For performing a laser treatment according to the characteristics of the first aspect, a laser beam that is generated by a $CO_2$ laser with an output power of more than 1 kW and even better more than 2 kW or more than 4 kW, is recommended. Preferably, hereby a laser pulse frequency is applied that is higher than 10 kHz. Also other laser sources, such as, for example, a Nd—YAG laser, as well as other laser pulse frequencies, are possible. In a preferred form of embodiment, one works with a short focal distance, for example, a focal distance of less than 10 cm, such that the power of the laser can be concentrated onto the top layer of the floor panel in an optimum manner. By "focal distance", the distance from the lens to the floor panel is meant. Preferably, the distance from the nozzle to the floor panel is kept small, too, for example, less than 1.5 mm, or even better less than 1 mm.

It is noted that, when the laser treatment according to the invention does not need to result in an effective material removal, but solely needs to result in a modification of the features of the beam-treated portion of the floor panel, the power of the applied laser beam can be limited to 100 or 200 Watts.

Further is noted that various precautions can be taken in order to promote the coupling of the laser energy in the floor panel. So, for example, in the case that the laser treatment is applied for treating the top layer of the floor panel, components can be present in the synthetic material or the resin that promote such coupling-in of the laser energy. So, for example, soot particles mixed into the resin may have a very beneficial effect. Also the application of hard particles other than Al2O3, such as TiC, TiO2, diamond, BC4 is recommended, as these have a more beneficial effect onto the coupling-in of the laser light in the synthetic material of the top layer. Agents that preferably are omitted as constituents and/or contaminants of the top layer are, for example, bauxite and barium sulfate.

The laser source preferably is erected external to the working area of the laser beam, for example, external to a machine in which both the respective laser treatment and another treatment step in the method are performed. In such a configuration, the laser beam is lead towards the lens over a stabilized optical path, either by mirrors, as can be the case with a $CO_2$ laser, for example, or by a glass fiber, as can be the case with a Nd—YAG laser.

In a preferred form of embodiment, the laser beam, on its optical path, can be split into several beams by means of a so-called "beam splitter". Splitting a beam originating from one laser source into at least two laser beams is advantageous in the case of a method for manufacturing floor panels, in view of the fact that in this manner two edges can be treated at the same time, whereas the space taken by laser sources, for example, by $CO_2$ laser sources, remains limited. Preferably, the two aforementioned laser beams treat two opposite sides of the floor panel. It is clear that in case a laser beam is split into several beams, the required power of the laser source equals the sum of the required power of the beams, plus the losses that occur as a result of the splitting.

It is clear that a method according to the first aspect of the invention, instead of being applied with the aforementioned laser treatment, can also be applied with another treatment, whereby this treatment utilizes a beam other than a laser beam, such as, for example, a water beam, an electron beam, an ion beam, a plasma beam, a particle beam, such as a sand beam, a spark beam, such as a series of sparks in electro-discharge erosion, or the like. It is noted that, for example, for applying electrical sparks, use can be made of a somewhat conductive top layer, such as is known, for example, from the international patent application WO 2004/050359.

A discoloration of an edge of a floor panel, such as explained in reference to the first aspect of the invention, can also be obtained by other heat sources than a laser beam. It is clear that such method, the discoloration being obtained by whichever heat source, provides for that the appearance of said disturbing white line is entirely or partially avoided. Therefore, the present invention, according to a second independent aspect, relates to a method for manufacturing floor panels, more particularly laminate panels of the type comprising a core, a decor, as well as a top layer on the basis of synthetic material, with the characteristic that the method comprises at least a treatment step whereby, by means of a heat source, a thermal treatment is given to at least one edge, preferably an upper edge, of the laminate panels, whereby this thermal treatment comprises a discoloration of the respective edge. Preferably, such method is applied as a post-treatment for coloring light-colored edges that are obtained as a result of a cutting treatment through the top layer of the laminate panels.

The inventors have found that setting the power of the heat source, e.g. of a laser beam, leads to setting the color of the treated edge. So, for example, it is possible to vary the obtained color between light brown and dark brown or black. These colors are particularly interesting for the post-treatment of floor panels imitating dark species of wood or stone. Such dark decors are present, for example, in imitations of wood species such as dark oak, wengé and the like, or in floor panels having a shadow effect at the edge in their decor, as can be the case, for example, when creating an optical illusion of an impression next to the edge, such as a chamfer, by means of the decor. In fact, with panels with such dark decors, the aforementioned white line will appear most disturbing. Preferably, in such method, use is made of a laser beam having an adjustable power between 20 and 200 W, and even better between 50 and 100 W. Obtaining said discoloration presumably occurs by means of one or more of the following possibilities:
partially burning the top layer,
partially burning the core,
partially burning the decor,
depositing soot particles as a result of burning either the top layer, or the core, or the decor,
starting a chemical reaction in the top layer or the core.

According to a deviating variant of a method according to the second aspect of the invention, it is also possible that a chamfer provided at the upper edge of the floor panel, or another surface obtained by removing a material portion at the upper edge of the floor panel, is provided with a color by means of a heat source. In a preferred form of embodiment of such method, the coloration takes place simultaneously with the application of said surface. This can be, for example, by means of a laser beam. It is noted that this deviating variant is preferable in particular with small surfaces, for example, with a dimension in one direction that is smaller than 1 mm.

According to its third aspect, the invention also relates to a method for manufacturing floor panels, more particularly laminate panels of the type comprising a core, a decor, as well as a top layer on the basis of synthetic material, with the characteristic that the method comprises at least a treatment step, whereby, at least partially by means of a laser treatment, a relief is applied on the upper surface of the floor panels.

The application of a relief on the upper surface of the floor panels, such as a relief that at least partially consists of a wood or a stone structure, at least partially excludes a press treatment and the wear of the press plate related thereto. Moreover, due to the digital control of a laser treatment, changing the relief is simple. Where traditionally a press plate had to be exchanged in order to provide another relief in the top layer of the laminate material, according to the third aspect of the invention the laser treatment can be controlled by another program in order to obtain said other relief in the top layer.

According to a deviating form of embodiment of the third aspect, the relief that is provided on the upper surface by means of a laser treatment, possibly in combination with the aforementioned wood or stone structure, can also comprise a zone from which material has been removed in order to imitate a joint or a chamfer. This zone can be situated as well at the edge of the floor panel as on the upper surface. In the latter case, it may, for example, be applied for rendering the appearance of a laminate imitating several wooden planks or stone tiles more realistic by removing material in the shape of a joint between the represented planks or tiles.

The obtained relief, for example, the wood or stone structure and/or the joint, thereafter may or may not be colored by means of a coloring product, for example, by means of a paint. The method, which is known as such from the international patent application WO 2004/108436, for coloring impressions provided in the top layer, can be applied to this end.

It is noted that also according to the third aspect, the laser treatment can be performed both on a larger board-shaped laminate material as on board-shaped laminate material already having the desired, or almost the desired, dimensions of the intended floor panel.

According to a fourth aspect, the present invention relates to a method for manufacturing floor panels, more particularly laminate floor panels of the type comprising a core, a decor, as well as a top layer on the basis of synthetic material, whereby this method comprises at least the following treatment steps:
producing a press plate that is provided with a relief,
forming the aforementioned floor panels, whereby said press plate is at least applied for realizing, by means of said relief, embossed portions in the upper surface of the floor panels, and more particularly in a board from which subsequently floor panels are formed,
with the characteristic that said relief in the press plate is realized at least by means of a laser treatment.

Because a laser treatment is digitally controlled, the method according to this fourth aspect of the invention leads to a flexible manufacturing of floor panels. It allows, for example, to obtain a press plate with a relief, such as a wood or a stone structure, without utilizing an etching process. The etching process is little flexible, as it requires many intermediate steps. Traditionally, an etching process in fact consists of providing a mask of gel that is hardened selectively by means of light, and thereafter etching away the portions of the press plate that are not covered by the mask. Obtaining a mask by selectively hardening gel can take place by covering gel portions that do not have to be hardened by means of a film and, after exposing the gel to light, rinsing away the unhardened gel portions.

It is noted that the laser treatment can relate to a material-removing, such as laser milling, as well as to a material-depositing process, such as laser cladding, selective laser sintering or selective laser melting. So, for example, in such manner material can be removed, which, for example, is showing at a wood or stone structure, or in a selective manner material, such as hard particles, for example, $Al_2O_3$, or the like, can be deposited, for example, in the form of a wood or stone structure.

Applying the laser treatment as a part of a material-depositing process, amongst others, in the case of producing a press plate with a relief, leads to particular advantages. For producing a relief intended, for example, for realizing embossed portions in the upper surface of the floor panels in the form of a wood or a stone structure, the press plate only has to be treated, or, in other words, material must be deposited onto the press plate only there, where the corresponding embossed portions, for example, the wood pores, have to be located at the floor panel. This is contrary to a material-removing process that has to treat the press plate everywhere, possibly with the exception of the locations where the corresponding embossed portions have to be located on the floor panel.

In general, it can be stated, however, this does not always have to be so, that less than one-half of the upper surface of the floor panel comprises embossed portions, such that a material-depositing process in most cases leads to a shorter treatment time. Also the possibility to deposit another material, such as wear-resistant ceramic material, for example, $Al_2O_3$, whether or not in a selective manner, is a particular advantage of applying a material-depositing process. In this manner, the surface, or certain portions of the surface, can be provided with particular properties; for example, the wear resistance of the press plate can be enhanced locally.

Applying a press plate according to the fourth aspect of this invention for forming a floor panel, or a board from which subsequently such floor panels are formed, results, by means of the aforementioned relief, in embossed portions in the floor panel which, for example, represent a wood or stone structure.

It is clear that the possibilities of the laser treatment are not limited to providing a wood or stone structure. So, for example, also a projection can be formed on the press plate that forms, during pressing, embossed portions on the upper surface or at the edge of the floor panels, which form, for example, a chamfer or a joint.

It is noted that the present invention also relates to a floor panel with the characteristic that, for the manufacture thereof, a method according to one or more aspects of the invention is applied.

Further characteristics of the aforementioned methods and floor panels will appear from the following described examples and the appended claims.

With the intention of better showing the characteristics of the invention, hereafter, as an example without any limitative character, several preferred forms of embodiment are described, with reference to the accompanying drawings, wherein:

FIG. 1, in a highly schematized manner, represents several treatment steps in a method for manufacturing floor panels according to the present invention;

FIGS. 2 to 5, at a larger scale, represent cross-sections according to lines II-II, III-III, IV-IV and V-V, respectively, in FIG. 1;

FIG. 6 shows a variant of the portion indicated by F6 in FIG. 2;

FIG. 7 represents a variant in a cross-section according to line VII-VII in FIG. 1;

FIGS. 8 to 10 represent more variants;

FIGS. 11 to 16 represent cross-sections similar to those of FIGS. 9 and 10, however, for further variants;

Figure 21:
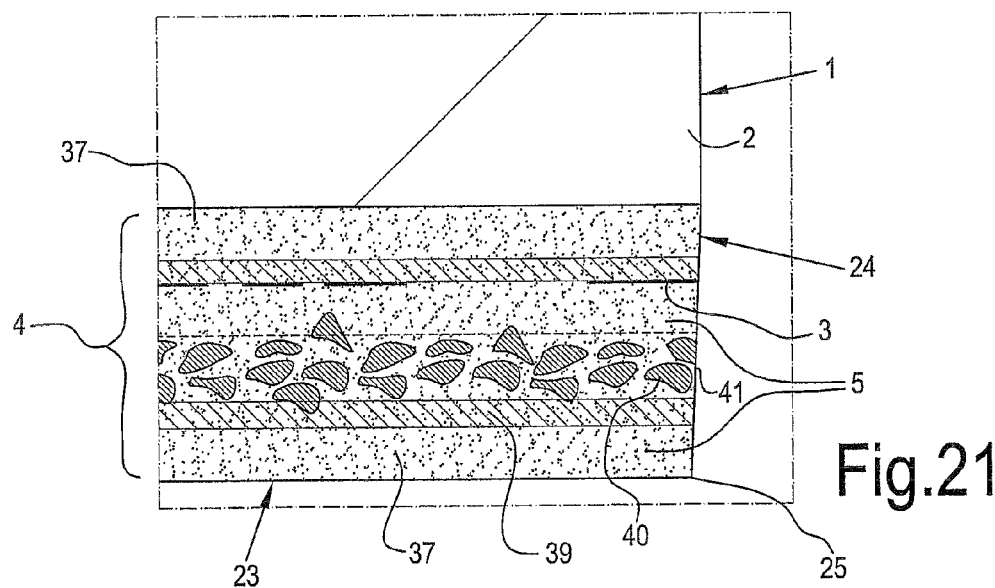
Figure 22:
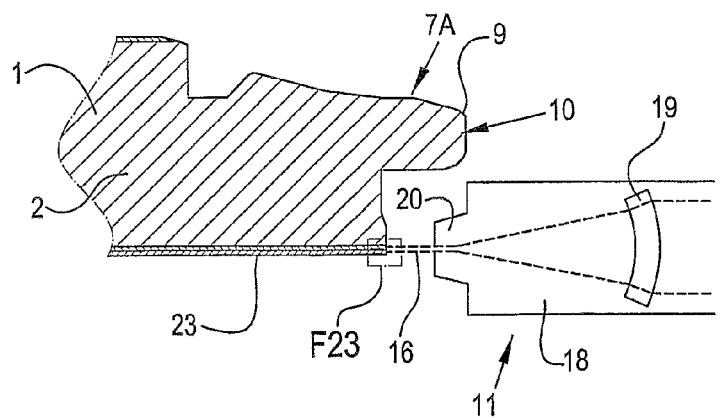
Figure 23:
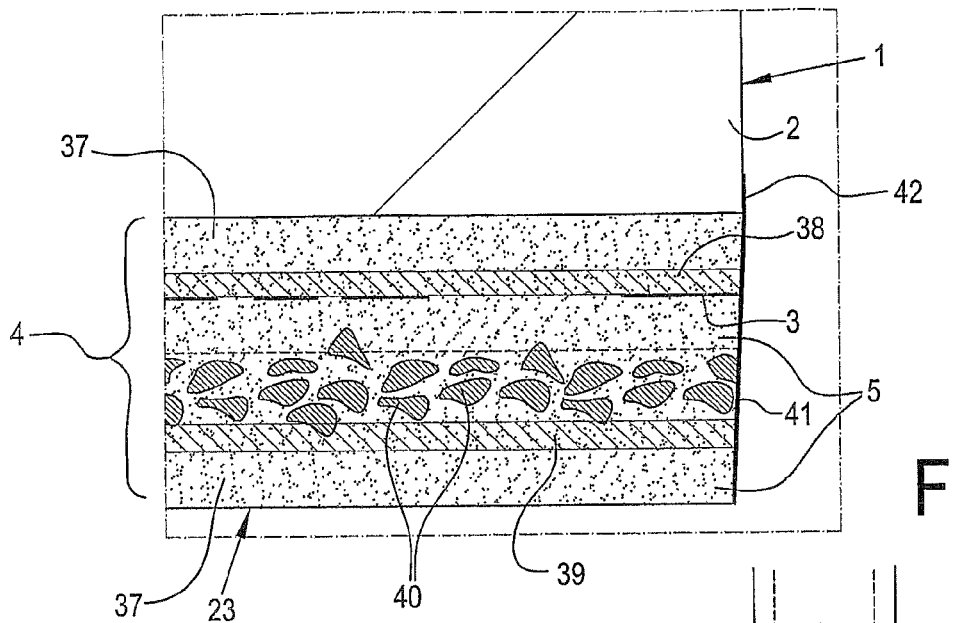
Figure 24:
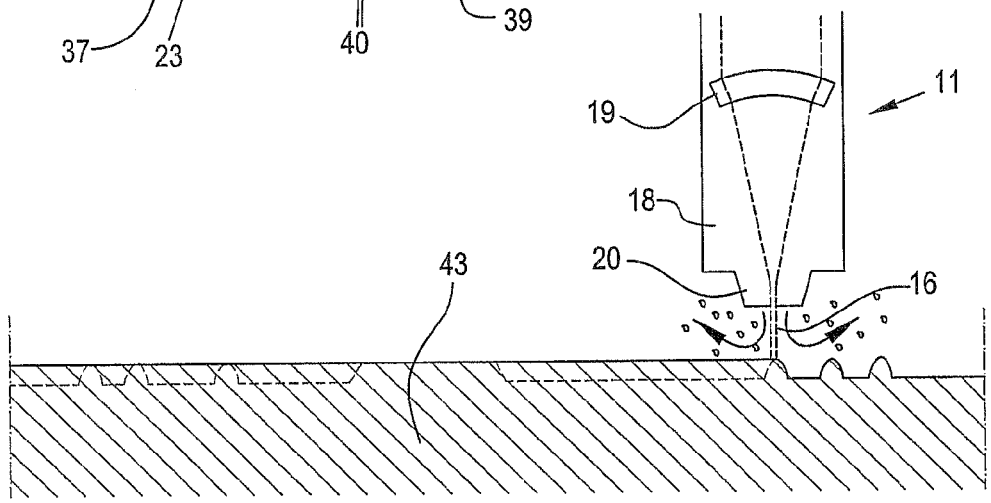
Figure 26:
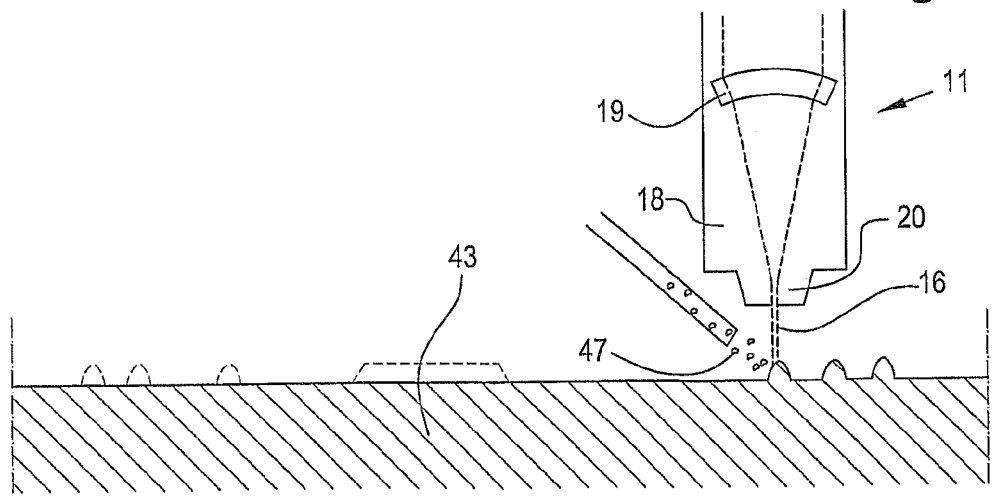
Figure 25:
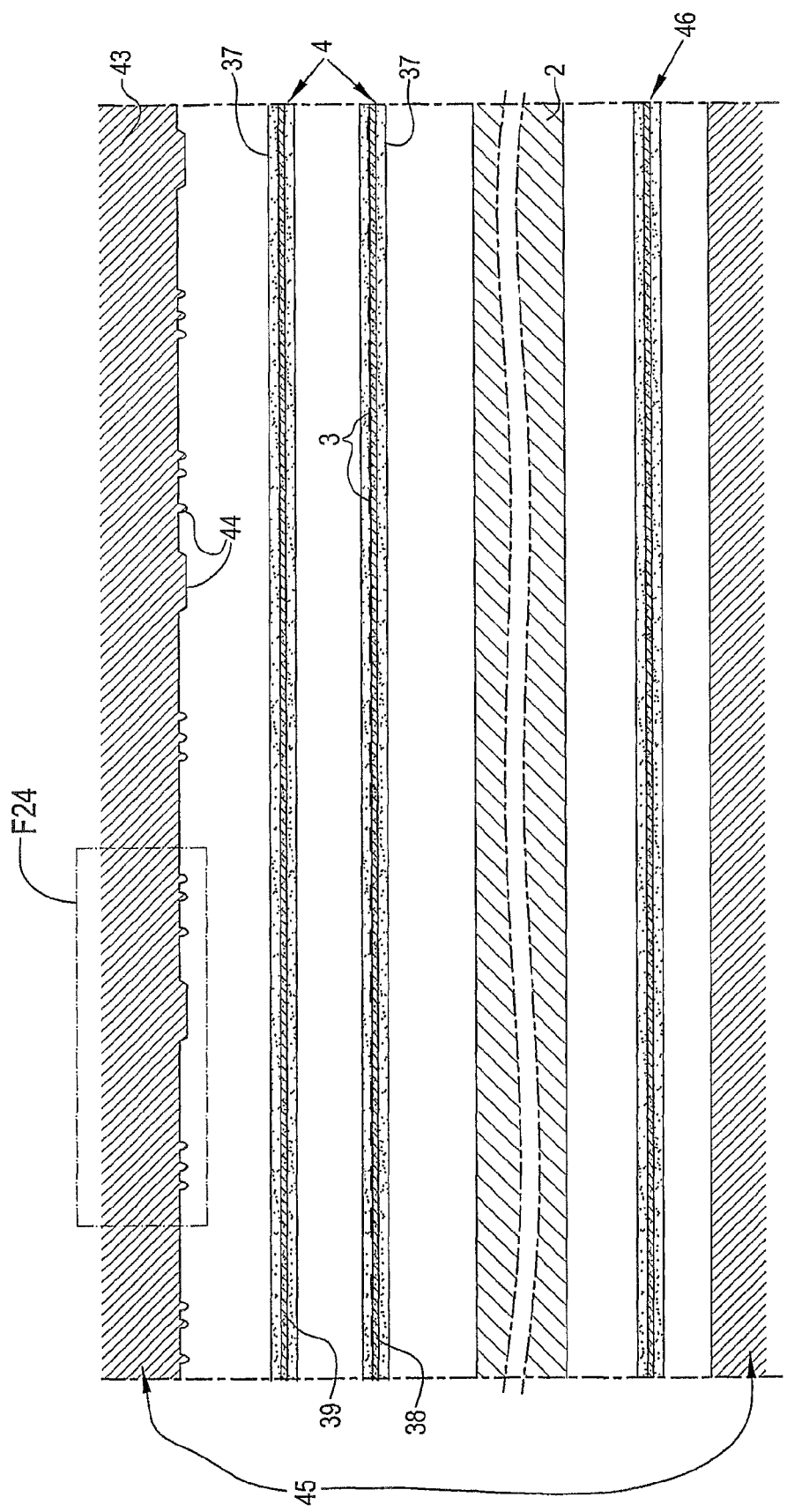
Figure 27:
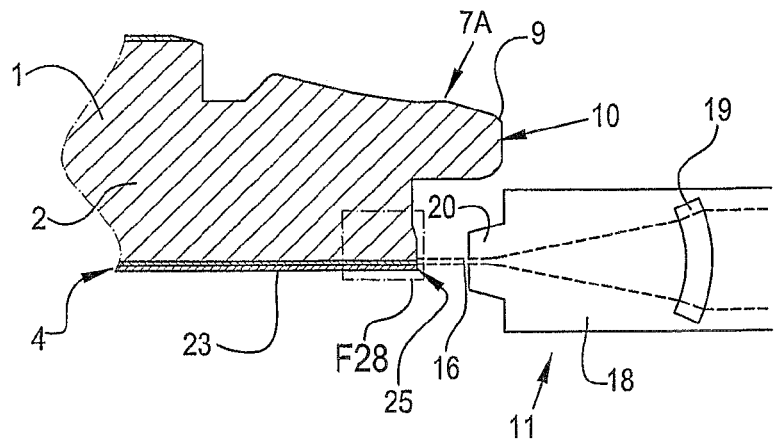
Figure 28:
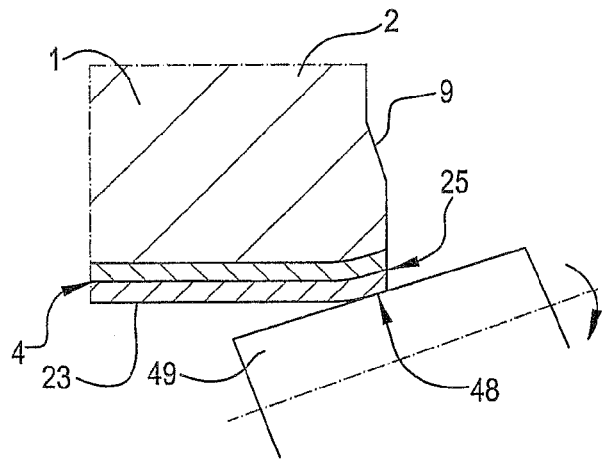
Figure 29:
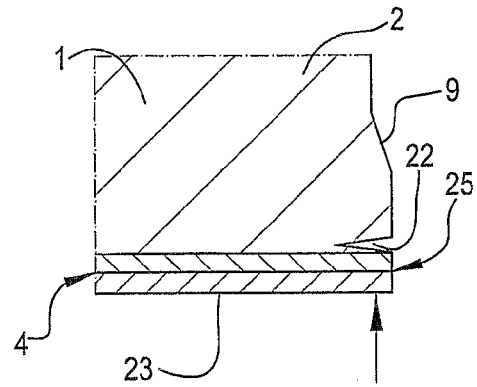
Figure 30:
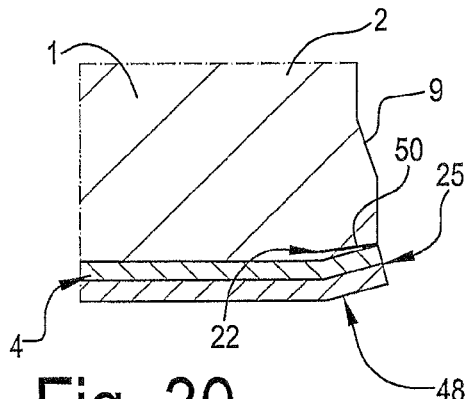
Figure 31:
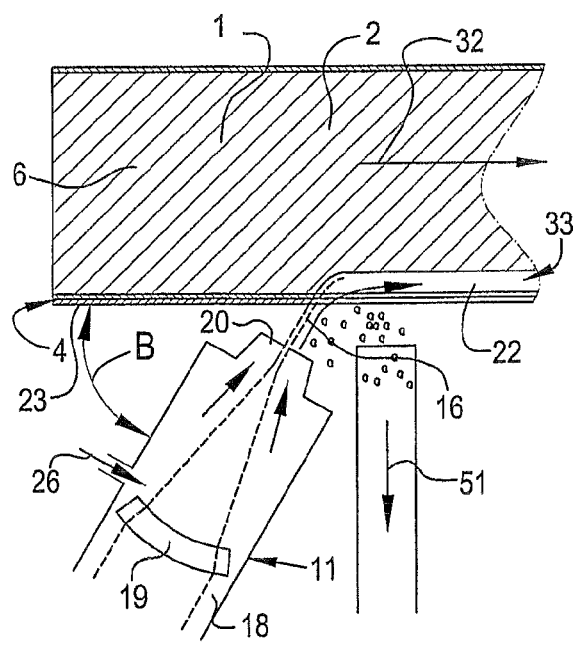

FIGS. 19 and 20, at a smaller scale, represent another method according to the invention;

FIG. 21 represents a highly enlarged and schematized representation of the area indicated by F18 in FIG. 5;

FIG. 22 represents another method according to the invention;

FIG. 23 represents a cross-section similar to that of FIG. 21, however, for a variant;

FIGS. 24 to 26 schematically represent still other variants according to the invention;

FIGS. 27 to 30 illustrate another two variants of methods according to the invention, whereby FIGS. 28 to 30, at a larger scale, represent the portion indicated by F28 in FIG. 27;

FIG. 31 represents still another preferred form of embodiment of a method according to the invention.

FIGS. 1 to 5 represent a method for manufacturing floor panels 1. More particularly, this relates to floor panels, 1, in particular laminate panels, of the type comprising a core 2, a decor 3, as well as a top layer 4 on the basis of synthetic material 5. For manufacturing the floor panels 1, one starts from a board-shaped material, in this case, board-shaped laminate material 6. In the represented example, this board-shaped laminate material 6 already has approximately the desired dimensions of one floor panel 1. After forming the floor panels 1 from the board-shaped material, the floor panels 1 have profiled edge portions 9, which at least comprise coupling parts 10, provided at least at two opposite sides, and in this case at all four sides, namely the longitudinal sides 7A-8A and the short sides 7B-8B. Hereby, the floor panels 1 are formed at least partially by means of a laser treatment 11 from the board-shaped material, in this case, thus, the laminate material 6. In this case, the floor panel 1 comprises profiled edge portions 9 at both pairs of sides and the laser treatment 11 is performed at each side.

For forming the floor panels 1, in the represented form of embodiment, apart from the aforementioned laser treatment 11, furthermore use is made of one or more other, preferably machining treatments 12, by means of one or more cutting tools 13, such as, for example, rotating or translating milling cutters 14, one or more saws 15 or the like, as described in the following. More particularly, in the example of FIG. 1 at each side 7A-8A-7B-8B one treatment step is performed by means of a saw 15 and two treatment steps are performed by means of a rotating milling cutter 14. Hereby, the so-called continuous milling is concerned. As represented, the floor panel 1 hereby first is moved with its longitudinal sides 7A-8A along the laser beams 16 and the rotating milling cutters 13 in order to form the respective edge areas 9, after which the floor panel 1 is subjected to similar treatments at its short sides 7B-8B.

In order to avoid that each laser beam 16 is operating unnecessarily, the respective laser performing the laser treatment 11 can be switched on and off by means of a signal detecting the presence or absence of a floor panel 1. Possibly, also a so-called "beam dumper" can be provided, which neutralizes such laser beam 16 when no floor panel 1 is present and the laser beam 16 unexpectedly would remain beaming.

The aforementioned other treatments 12, in this case, the three successive machining treatments at two opposite sides 7-8 of the floor panel 1, preferably are performed in one and the same machine 17. Preferably, the laser treatment 11 also shall be performed in this machine 17, although it is not excluded that particular advantages are obtained when the laser treatment 11, as represented in FIG. 1 for the treatment of the short sides 7B-8B of the floor panel 1, takes place outside machine 17 with which said other treatments 12 are performed. When mounting the laser head 18 in a conventional processing machine, it is recommended to protect it as good as possible from dust created as a result of said other treatment 12, which, of course, is less critical when the laser head is situated outside machine 17. By "laser head 18", that part of the laser installation is intended that comprises the lens 19 and the so-called nozzle 20. Remaining parts of the laser installation, such as, for example, the laser source and the optical path, are not represented in the figures, however, preferably are situated external to machine 17.

It is clear that the sequence of the treatments, such as, amongst others, those represented in FIG. 1, can be varied at random and that, for example, first one or more other treatments 12 can be performed at the board-shaped laminate material 6 before performing the laser treatment 11, such as, for example, illustrated by the alternative arrangement 21 of the laser represented in dashed line in FIG. 1. Also, the laser treatment 11 can be followed by one or more other or similar treatments. It is also clear that it is possible to first treat the short sides 7B-8B and thereafter the longitudinal sides 7A-8A of the floor panel 1. Also the simultaneous or alternating performance of treatments at the longitudinal and short sides is not excluded, and one can also restrict oneself to processing only the longitudinal, or only the short sides, or only one side. Also, several laser treatments can be performed at one side, whether or not realizing a common cut.

Figure 2:
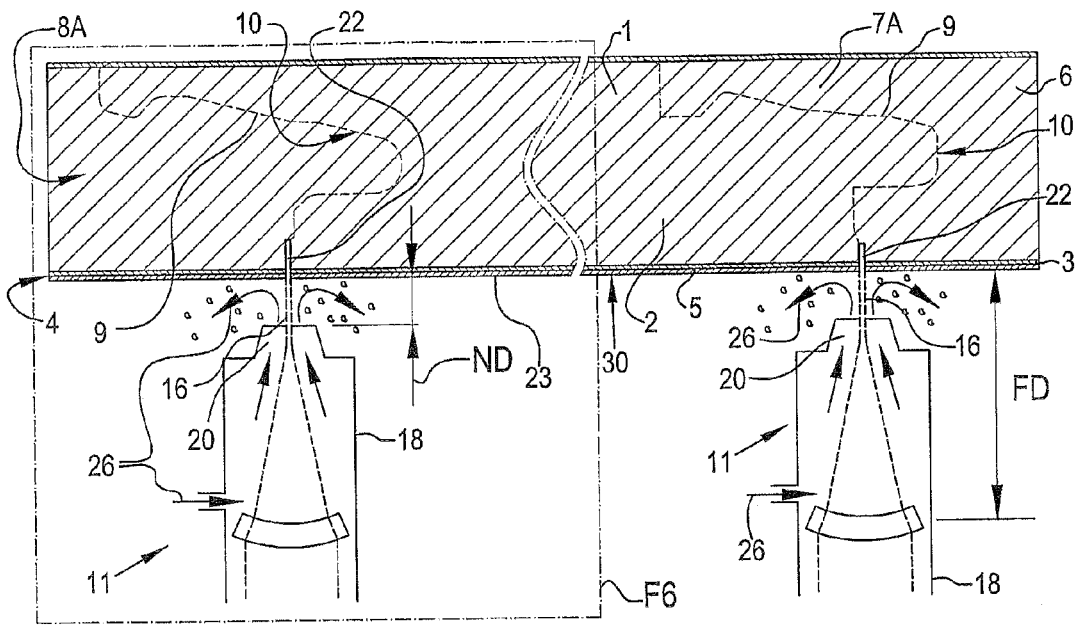

As represented in FIG. 2, the laser treatment 11 preferably is applied at two opposite sides 7A-8A, and even better simultaneously at these two sides. Both laser beams applied thereby then preferably originate from one laser source, the beam of which is split by means of a so-called "beam splitter", which is known as such. It is clear that also more than two laser beams can be applied at the same time, or that more than two sides can be simultaneously treated, whether or not by laser beams originating from one and the same laser source.

The laser treatment 11 represented in FIG. 2 is applied at least for removing a material portion 22 from the top layer 4 and more particularly for forming a cut therein. Here, the treatment is also applied for removing a material portion 22 from the core 2, in such a manner that the laser treatment 11 in this case also defines at least the profiled edge area finally to be realized. In the represented example, the laser treatment 11 applies a cut in the decorative side 23 of the floor panels 1, whereby a portion of the obtained surface 24 forms the upper edge 25 of the floor panels 1.

It is noted that it is recommended to keep the distance FD between the laser lens and the floor panel 1, the so-called focal distance, small, for example, smaller than 10 cm. In this manner, the laser energy is concentrated in a small area, such that substantially solely the top layer 4 and possibly the core 2 directly beneath the top layer 4 are removed. Maintaining a short focal distance guarantees an energy-efficient treatment of the top layer 4 of the floor panel 1.

The distance ND ("nozzle distance") of the nozzle 20 to the floor panel 1 is in the order of magnitude of 1 mm. Minor deviations that may manifest themselves in the distance ND have only a small impact on the efficiency in general or the depth of such laser treatment 11 in particular. So, for example, the typical deviations in the order of magnitude of 0.05 mm as a result of transporting the floor panels 1 along the laser beam 16 will have no or almost no influence.

It is noted that, at least in the represented examples, the floor panels 1 are processed with the decorative side 23 downward. It is clear that within the scope of the invention, also other orientations of the floor panels 1 and the pertaining treatments are possible. It is clear that the floor panels, during processing, are guided in a suitable manner. Guiding techniques are known as such and thus are not set forth in greater detail.

Further is noted that during the performance of a treatment step in which a laser is applied, preferably a cutting gas 26 is used, for example, compressed air, nitrogen or the like, which, by the nozzle 20, is supplied coaxially with the laser beam 16. The function of such cutting gas 26 can be a double one. Firstly, this gas cools the lens 19; secondly, it can blow away a portion of the possibly removed material of the floor panel 1. Synergetic effects between the cutting gas 26 and the laser treatment 11, by which the efficiency of the laser treatment 11 increases, are not excluded.

In the represented arrangement, it is recommended to pay particular attention to keeping the laser lens 19 free of dust or any other dirt. This is possible by providing, for example, a continuous air stream above the laser lens, such that the chance that an incident dust particle remains on the laser lens is minimum. Such dust particle can lead to burning-in and increases the risk of the lens 19 bursting. It is also possible to build a screen around the entire laser apparatus, out of which the laser beam 16 can be guided by means of a window. In the case of a $CO_2$ laser beam, such window may consist, for example, of ZnSe. In the case of a Nd—YAG laser, the window may consist of glass or quartz. In connection therewith, it is also noted that a so-called "fiber laser" can be applied in such dust-rich environment in an advantageous manner. Namely, such lasers can be built in the same power range as a $CO_2$ laser, however, offer a larger incorporation flexibility for the integration thereof in a machine 17. Nd—YAG and fiber lasers in particular will be applied there, where the material portion 22 to be removed does not contain any organic material.

Figure 3:
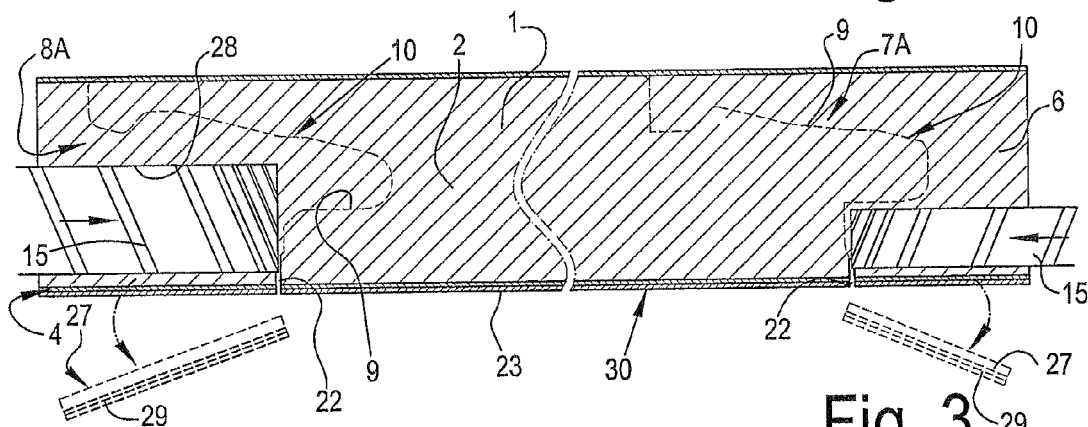
Figure 4:
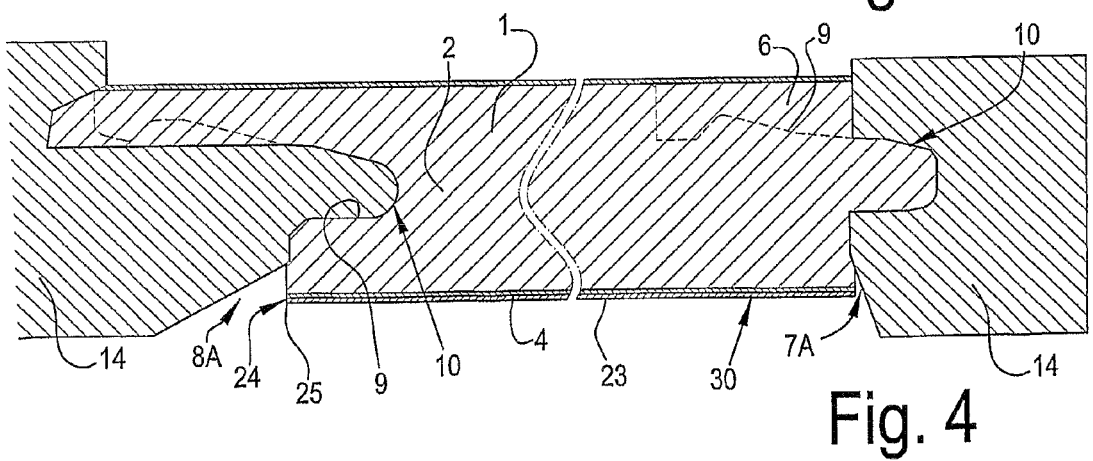

As represented in FIGS. 3 to 5, the aforementioned laser treatment 11 and the subsequent aforementioned other treatments 12, in this case the aforementioned three machining treatments, are combined such that by applying the laser treatment 11, the contact between the cutting tools and the aforementioned top layer 4 is reduced, or, as in this example, is avoided.

To this aim, as shown in FIG. 3, in a treatment following the laser treatment 11, a material portion 27 can be removed, by means of a saw cut 28, up into the aforementioned cut, such that the surplus portion 29 of the top layer 4, and possibly a portion of the core 2 beneath this top layer 4, is separated from the floor panel 1 and thus the contact between cutting tools in subsequent treatments and the top layer 4 is limited and preferably even is avoided. FIGS. 4 and 5 show how the edge regions 9 of the floor panels 1 thus can be formed further, for example, by means of rotating milling tools.

FIG. 6 shows that in a preferred form of embodiment, the laser beam 16 is incident under an angle A<90°, preferably under an angle A=87° up to 89°, onto the upper side 30 of the floor panel 1. In this manner, the laser treatment 11 creates an inwardly inclined edge at the upper edge 25 of the panels, whereby a good adjoining among adjacent floor panels 1 in a floor covering can be obtained. FIG. 6 also represents an additional extern gas flow 31, which is applied approximately perpendicular to the laser beam 16, directed away from the floor panel 1 to be formed, in such a manner that a possible deposition is blown away from the panel.

FIG. 7 represents a particularly preferred form of embodiment of the method according to the first aspect of the invention. Hereby, the laser beam 16 is directed considerably inclined in respect to the direction of movement 32 of the floor panels 1, such in a direction as represented and such as defined in the claims. Preferably, the laser beam 16 forms an angle B<80°, and even better an angle B in the order of magnitude of 60°, with the upper side 30 of the floor panel 1. Surprisingly, the inventors have found that such inclination minimizes a potential deposition of the removed material, whereas the efficiency and quality of the treatment remains acceptable. Presumably, the first is due to the fact that the cutting gas 26 blows away the removed material along the already formed cutting line 33. It is noted that the invention does not exclude that the laser beam 16 also assumes other angles in respect to the floor panel 1, for example, an angle B>90°.

Preferably, the forms of embodiment of FIG. 6 and FIG. 7 shall be combined in order to thereby obtain an optimum safeguarding against deposition on the floor panel 1 and to obtain a good adjoining of the floor panels 1. It is evident that the aforementioned extra gas flow can be applied in all forms of embodiment of all aspects.

FIG. 8 shows a variant of the method according to the first aspect of the invention, whereby first a laser treatment 11 and a saw cut 28 are performed, as described herein above by means of FIGS. 2 and 3, however, such that the saw cut 28 does not reach up into the cut of the laser beam 16, and therefore the surplus portion of the top layer 4 will not be separated automatically. However, the saw cut 28 is performed such that the mutual distance d between this saw cut 28 and the cut provided by means of the laser beam 16 allows to break off the surplus portion 29 of the top layer 4 by means of a pressure element. In case that the method is applied to a floor panel 1, the core 2 of which substantially consists of a material on the basis of fibers, such as, for example, MDF or HDF, it is preferred that the distance d in most cases is restricted to 0.7 mm. This pressure element simply can consist of a guide 34 varying its height in longitudinal direction, which pushes away the surplus portion of the top layer 4 and effects the breaking off of this portion of the core 2 of the floor panel 1.

FIGS. 9 and 10 represent a variant of a method according to the invention. Hereby, first a saw cut 28 is provided in a side of the floor panel 1, and thereafter, by means of a laser treatment 11, a cut 22 is performed up into said saw cut 28, such that in this case, too, the surplus portion of the top layer 4 is released, for example, automatically, or can easily be pushed away, as explained herein above with reference to FIG. 8. After these treatment steps, the profiled edge areas 9 can be formed further, for example, as represented in FIGS. 4 and 5, such that contact between the possible cutting tools and the top layer 4 is limited or avoided.

FIGS. 11 and 12 show a variant, whereby the surplus portion of the top layer 4 first, preferably to a major part, is removed by means of, for example, a rough and, due to its simple straight shape, easy to grind milling cutter 14, after which a laser treatment 11 is performed that shapes the upper edge 25 of the panel. After both treatments, other treatments, for example, treatments as represented in FIGS. 4 and 5, further shape the profiled edge area. During further shaping the profiled edge area, the contact between the cutting tools and the top layer 4 shall be limited, or even avoided.

As FIG. 13 shows, it is not excluded that the laser treatment 11 shaping the upper edge 25 of the floor panel 1 is performed after forming the coupling parts 10.

FIGS. 14 to 16 show another variant of the method of FIG. 1. Hereby, the surplus portion 29 of the top layer 4 is only to a major part removed by providing, for example, successively a cut 22 in the top layer 4 by means of a laser treatment 11 and removing a material portion 22, for example, by means of a saw 15, up into the aforementioned cut. Hereafter then preferably treatments follow analogous to those represented in FIGS. 4 and 5. It is noted that such saw in all described cases also may be a milling cutter or another tool. The upper edge 25 of the floor panel 1 then preferably can be formed in the last treatment step, for example, also by a machining treatment, which then, however, will come into contact with the top layer 4. The possibly applied cutting tool 13 during forming of the upper edge 25 of the panel preferably shall consist of polycrystalline diamond (so-called "PKD"), and still better of mono-crystalline diamond (so-called "MKD"). Also, cutting tools can be applied, the cutting edge of which is coated with a hard layer, such a chemically vapor-deposited diamond coating (in English known as "CVD tools" or "Chemical Vapor Deposition Tools").

A method as represented in FIGS. 14 to 16 can be applied, for example, when the upper edge 25 of the floor panel 1 is formed by a chamfer, whereby this chamfer is entirely formed by a cutting tool 13.

Figure 17:
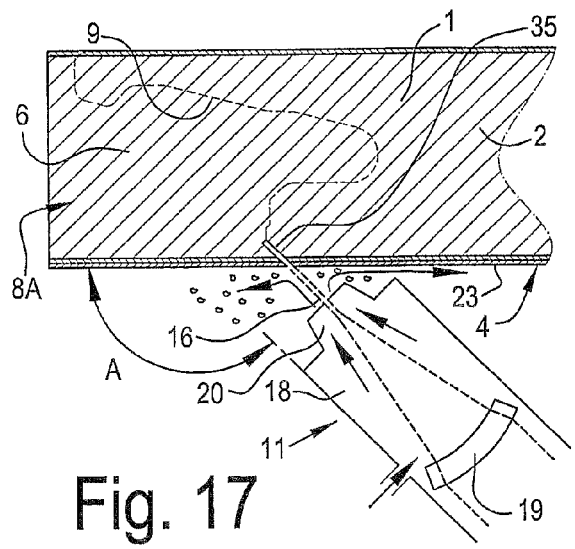
FIGS. 17 and 18 represent another variant.
Figure 18:
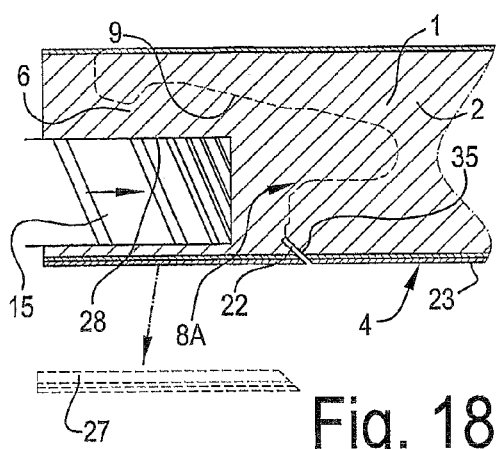

FIGS. 17 and 18 illustrate a method whereby the aforementioned profiled edge area comprises such chamfer that is formed at least partially by the aforementioned laser treatment 11. When performing such treatment, the laser beam 16 will meet the floor panel 1 in an inclined manner, namely at an angle A>90°, and still better at an angle A in the order of magnitude of 135°. As represented in FIG. 18, subsequently thereto also a saw cut 28 can be performed similar to the one represented in FIG. 3, such that the surplus portion of the top layer 4 is removed and that during the aforementioned other treatments 12 no, or only a limited, contact with the top layer 4 is made. Also, the laser treatment can be applied exclusively for forming the chamfer, or for a portion thereof, whereas all other material is milled away, whether or not by means of milling treatments through the top layer, whereby the laser then only has the purpose of forming the surface of the chamfer.

As illustrated in FIGS. 1 to 18, various variants of a method according to the first aspect of the invention are possible. It is clear that within the scope of the invention, various treatment steps can be combined to a method for forming a floor panel 1 that entails one or more of the above-mentioned advantages. Also, the mutual sequence of the various treatment steps can be changed at random, or laser beams can be applied in several treatment steps.

FIGS. 19 and 20 show a variant of a method according to the first aspect of the invention. Contrary to the examples shown in FIGS. 1 to 18, the laser treatment of FIGS. 19 and 20 is performed at board-shaped laminate material 6, from which during or after the laser treatment 11 several floor panels 1 are obtained. In this case, material portions are removed from the top layer 4 by means of several laser beams, and preferably those removed material portions continue up into the core 2 of the board-shaped laminate material 6. The other treatment 12, for example, a saw treatment as represented by saws 36, following after said laser treatment 11, can, without contacting the top layer 4, divide the board-shaped laminate material 6, for example, into smaller pieces of board-shaped laminate material 6 having approximately the desired dimensions of a floor panel 1. These smaller pieces then can be subjected to a method as represented in FIGS. 1 to 18.

FIG. 21 represents, highly enlarged, the top layer 4 of a floor panel 1. This top layer 4 is situated on top of the core 2 of the floor panel 1 and consists of two carrier sheets soaked in resin 37, of which one carrier sheet 38 carries a printed decor 3 representing, for example, a wood pattern or a stone pattern, and forms the decor layer. The decor layer is covered by a so-called overlay, which consists of a transparent carrier sheet 39 also soaked in resin. The represented top layer 4 also comprises particles 40 consisting of a wear-resistant, preferably ceramic, material, such as $Al_2O_3$. The particles 40 are represented at the bottom side of the overlay, however, it is clear that they can be situated everywhere in the top layer 4, however, preferably above the decor 3. By the laser treatment 11, at the top layer 4 a smooth surface 41 at the cut can be obtained, as on the obtained surface, as represented, no or almost no projecting hard parts are present. By the laser treatment, the hard particles namely are molten, vaporized or split by a thermal shock related to the laser treatment, contrary to another treatment 12, as, for example, milling, whereby the particles are drawn in pieces out of the material and thus a rather rough cut is created.

The core 2 of the floor panel 1 preferably consists of a material on the basis of fibers, preferably wood fibers, which are consolidated by a binding material, such as MDF or HDF. Preferably, when performing the laser treatment 11, the binding material becomes plastic and is this treatment step followed by a treatment whereby the fibers are pressed into the binding material by means of a pressing element, such that, when the binding material is cooling off again, a smooth surface is obtained.

FIGS. 22 and 23 represent a method according, amongst others, the second aspect of the invention. To this aim, this method comprises at least a treatment step in which, by means of a heat source, in this case a laser beam 16, a thermal treatment is given to at least one edge, preferably an upper edge 25, of the laminate panels, whereby this thermal treatment includes a discoloration 42 of the respective edge. FIG. 23 shows an enlarged view of the area indicated by F23 in FIG. 22 and shows that the respective discoloration preferably manifests itself at least on the top layer 4, and, as represented, still better continues over the entire top layer 4 even up to the core 2. The discoloration presumably is obtained by the partial burning of the top layer 4 and/or the core 2 and/or the decor 3 and/or the deposition of soot particles as a result of a burning, either of the top layer 4, or of the core 2 or of the decor 3.

Preferably, the heat treatment in the second aspect of the invention is performed by means of a heat source, the power of which can be set in function of the desired color of the respective edge. Hereby, a variation between light brown and black is preferred, as such discoloration is desired in particular with dark decors.

FIGS. 24 and 25 illustrate a method according to the fourth aspect of the invention. To this aim, they represent a method comprising at least two treatment steps.

FIG. 24 illustrates the first treatment step, namely producing a press plate 43, which is provided with a relief 44. As represented in FIG. 24, this relief is realized at least by means of a laser treatment 11. Here, a laser treatment 11 is concerned that is digitally controlled and removes material portions from a substrate in order to form the aforementioned relief on the press plate. The represented relief consists of several kinds of projections. These projections are intended, for example, for applying embossed portions in the floor panel 1 in the shape of wood pores or the like, or in order to impress joints into the laminate material 6. The use of such relief is well known as such.

FIG. 25 shows how such press plate then in a second treatment step is applied for forming the aforementioned floor panels 1, in order to realize, by means of said relief, embossed portions in the upper surface of the floor panels 1, and more particularly in a board-shaped laminate material 6, from which subsequently such floor panels 1 are formed. In this case, this relates to a laminate material 6 of the DPL type, whereby in a press 45, at the upper side of a core 2, preferably a wood-based core 2, the top layer 4, consisting in this case of two carrier sheets soaked in resin, is directly pressed upon the core 2 under the influence of temperature and pressure. At the underside of the core 2, a backing layer 46 is provided, which also consists of a carrier sheet soaked in resin.

According to a particular preferred form of embodiment, which is represented in FIG. 26, the press plate is provided with a relief by means of a material-depositing process, for example, a laser treatment, such as selective laser sintering, laser cladding or the like. By such process, the relief can be built up in layers and this relief possibly may consist of another material than the material of the press plate, for example, a material with particular features, such as a wear-resistant material. As represented, this material 47 can be supplied in the form of a powder, after which it is consolidated at the desired location, for example, under the influence of a laser beam 16. In such laser treatment, it is preferred to apply a Nd—YAG laser, in combination with a so-called scanner. This scanner, as known, consists of a set of mirrors deflecting the beam towards the desired location of incidence on the press plate.

It is noted that the various aspects of the invention can be combined with each other, as long as they are not contrary to each other, to form a method for manufacturing floor panels, which, when being performed, offers one or more of the above-mentioned advantages.

Further, it is noted that by the aforementioned movement of the floor panels 1 over the laser beam 16, or the possible cutting tools of the aforementioned other treatment 12, a relative movement is intended and that it is thus not excluded that both the floor panels 1 and the laser beam 16 move and/or that, in a particular case, only the laser beam 16 moves. The most preferred form of embodiment, however, is the one whereby only the floor panels 1 are moving.

FIGS. 27 and 28 represent a method according to the invention, whereby the laser treatment 11 is applied for manufacturing floor panels 1 whereby a sunk edge area 48 is provided at one or more upper edges 25. More particularly, hereby the sunk edge area 48 is realized at least by means of a laser beam 16 beaming on the floor panel 1 at the height of the upper edge 25. As represented in FIG. 27, the laser beam 16 is applied at least for heating and/or softening the top layer 4 and/or of a material situated therebeneath. As represented in FIG. 28, then the heated or softened material, by means of a pressing roller 49 or other pressing element, is transformed to a sunk edge area 48.

According to an alternative method that is illustrated in FIGS. 29 and 30, the laser treatment of FIG. 27 is applied for removing a material 22 from the top layer and/or a material situated therebeneath, more particularly the core 2, in such a manner that the portion of the top layer 4 situated at the upper edge 25 of the floor panel can be pushed towards the core 2 or the like, such that in this case, too, a sunk edge area is created. It is noted that, when performing this method, preferably glue 50 is provided in the formed cut 22 in order to retain said portion of the top layer 4 in its transformed position, in other words, the position of this portion represented in FIG. 30.

FIG. 31 represents a method according to the invention whereby at least a suction effect or suction operation 51 is created transverse, and in this case perpendicular, to the surface or decorative side 23 of the floor panel 1 to be formed, above the already formed cut 22 in the immediate proximity of the laser front. By the immediate proximity of the laser front is meant there, where the smoke gasses and particles rise or are deposited. As aforementioned, such suction operation 51 preferably is combined with a blowing operation, such as, for example, the external gas flow 31 represented in FIG. 6.

According to a deviating form of embodiment of the invention, another beam technique instead of "laser" shall be applied, where this is possible. The laser beam can be replaced, for example, for cutting, by a beam of another medium, whereby medium has to be understood in its broadest sense, and whereby, amongst others, an ion beam, electron beam, liquid beam, gas beam, spark beam (electric discharge machining), or the like are contemplated.

The present invention is in no way limited to the forms of embodiment described by way of example and represented in the figures; on the contrary may such method and such panel be realized according to various variants, without deviating from the scope of the invention. The aforementioned saw cut 28, for example, may also be realized in any other manner, possibly with a laser, too.

What is claimed is:

1. Method for manufacturing floor panels comprising a core, a decor, and a top layer having a composition based on a synthetic material, comprising at least the following treatment steps:
    producing a press element that is provided with a relief,
    forming the floor panels, by applying said press element to the panels to produce, by way of said relief, embossed portions in the upper surface of the floor panels, wherein said forming is started from a flat press element and wherein said relief on the press element is formed at least by a material depositing process comprising the step of providing the material for the relief in the form of a ceramic powder material different than the material of said flat press element, and then adhering it to said flat press element; the deposition of said material being digitally controlled and being performed only where the corresponding embossed portions have to be located at said floor panel.

2. The method of claim 1, wherein said relief is built up of several layers.

3. The method of claim 2, wherein said material is a wear-resistant material chosen from the list consisting of $Al_2O_3$, SiC and diamond.

4. The method of claim 1, wherein said material depositing process comprises sintering or cladding material in the form of powder to the surface of said press element.

5. The method of claim 1, wherein said relief consists of several kinds of projections.

6. The method of claim 1, wherein said material depositing process comprises a laser treatment.

7. The method of claim 4, wherein the ceramic powder material is consolidated under the influence of a laser beam.

8. A method of manufacturing an embossed floor panel with a relief comprising:
    depositing a ceramic powder material on a flat press element, wherein said flat press element is not said ceramic powder, and said depositing is digitally controlled, comprises a laser treatment, and is performed only where an embossed portion is to be located; and
    adhering said ceramic powder material to said flat press element to produce a non-flat press element; and
    applying the non-flat press element to the upper surface of a floor panel to produce said embossed floor panel with a relief, wherein said floor panel comprises a core, a decor and a top layer.

* * * * *